(12) United States Patent
Al-Jeshi et al.

(10) Patent No.: US 11,919,816 B2
(45) Date of Patent: Mar. 5, 2024

(54) CERAMIC MEMBRANES

(71) Applicants: Saudi Arabian Oil Company, Dhahran (SA); Ecole Nationale Supérieure de Chimie de Montpelli, Montpellier (FR)

(72) Inventors: Subhi Mohammed Hassan Al-Jeshi, Qatif (SA); Aziz Cherifi, Geney (FR); David Cornu, Les Matelles (FR); Sophie Cerneaux, Lattes (FR)

(73) Assignees: Saudi Arabian Oil Company, Dhahran (SA); Ecole Nationale Supérieure de Chimie de Montpelli, Montpellier (FR)

(*) Notice: Subject to any disclaimer, the term of this patent is extended or adjusted under 35 U.S.C. 154(b) by 0 days.

(21) Appl. No.: 17/804,209

(22) Filed: May 26, 2022

(65) Prior Publication Data
US 2022/0289634 A1 Sep. 15, 2022

Related U.S. Application Data

(62) Division of application No. 15/837,563, filed on Dec. 11, 2017, now abandoned.

(51) Int. Cl.
*C04B 35/622* (2006.01)
*B01D 63/06* (2006.01)
(Continued)

(52) U.S. Cl.
CPC ...... *C04B 35/62218* (2013.01); *B01D 63/066* (2013.01); *B01D 67/0067* (2013.01);
(Continued)

(58) Field of Classification Search
None
See application file for complete search history.

(56) References Cited

U.S. PATENT DOCUMENTS

| 5,632,890 A | 5/1997 | Sugimoto |
| 7,169,213 B2 | 1/2007 | Liu et al. |

(Continued)

FOREIGN PATENT DOCUMENTS

| CN | 1509805 | 7/2004 |
| CN | 101088922 | 12/2007 |

OTHER PUBLICATIONS

Konneger et al., "Planar, polysilazane-derived porous ceramic supports for membrane and catalysis applications", J. Am. Ceram. Soc., 98,[10], 2015 (Year: 2015).*

(Continued)

*Primary Examiner* — Krishnan S Menon
(74) *Attorney, Agent, or Firm* — Fish & Richardson P.C.

(57) ABSTRACT

A filter including a porous support defining one or more channels therethrough, and a porous ceramic membrane layer on a surface of the porous support defining at least one of the one or more channels. The ceramic membrane layer includes an inorganic ceramic composition having the formula $SiM^P_{xp}C_yN_zO_mH_n$, where each $M^P$ present is independently selected from a p-block element or a d-block element; p is an integer from 1 to 5; for each $M^P$ present, xp is independently from about 0 to about 60; y is from about 0 to about 60; z is from about 0 to about 60; m is from about 0 to about 40; and n is zero or nonzero. At least one of y and z is nonzero when p is zero, and p is nonzero when y and z are both zero.

5 Claims, 5 Drawing Sheets

(51) Int. Cl.

| | |
|---|---|
| *B01D 67/00* | (2006.01) |
| *B01D 69/02* | (2006.01) |
| *B01D 69/04* | (2006.01) |
| *B01D 69/10* | (2006.01) |
| *B01D 69/12* | (2006.01) |
| *B01D 71/02* | (2006.01) |
| *C02F 1/44* | (2023.01) |
| *C04B 35/01* | (2006.01) |
| *C04B 35/16* | (2006.01) |
| *C04B 35/48* | (2006.01) |
| *C04B 35/571* | (2006.01) |
| *C04B 38/00* | (2006.01) |
| *C04B 111/00* | (2006.01) |

(52) U.S. Cl.
CPC ............ *B01D 69/02* (2013.01); *B01D 69/04* (2013.01); *B01D 69/108* (2022.08); *B01D 69/1216* (2022.08); *B01D 71/024* (2013.01); *C02F 1/444* (2013.01); *C04B 35/013* (2013.01); *C04B 35/16* (2013.01); *C04B 35/48* (2013.01); *C04B 35/571* (2013.01); *C04B 38/0003* (2013.01); *B01D 2323/12* (2013.01); *B01D 2325/028* (2013.01); *C04B 2111/00801* (2013.01)

(56) References Cited

U.S. PATENT DOCUMENTS

| | | | |
|---|---|---|---|
| 8,485,366 | B2 | 7/2013 | Isomura et al. |
| 8,585,795 | B2 | 11/2013 | Sigmund et al. |
| 8,596,465 | B2 | 12/2013 | Hishiki et al. |
| 8,791,037 | B1 | 7/2014 | Berchtold et al. |
| 2004/0009865 | A1 | 1/2004 | Nair |
| 2012/0255904 | A1 | 10/2012 | Nagghappan |
| 2018/0169588 | A1 | 6/2018 | Song et al. |

OTHER PUBLICATIONS

Vueguard 901™ "Coating methods", Performance coatings international (2014) (Year: 2014).*
Chareyre et al., "Si—Zr—C—N-based hydrophobic plasma polymer membranes for small gas molecule separation," Thin Solid Films, Jan. 2013, 527:87-91, 5 pages.
Vakifahmetoglu et al., "Highly porous macro- and micro-cellular ceramics from a polysilazane precursor," Ceramics International, 2009, 35:3281-3290, 11 pages.
EPO Communication Pursuant to Article 94(3) EPC in European Appln. No. 18819490.6, dated Jan. 11, 2023, 5 pages.
Clariant, "Ceraset PSZ 20, Thermally Curable High-Temperature Resin," Technical Information, Nov. 30, 2011, 2 pages.
Hauser et al., "Polymer-Derived SiBCN Ceramic and their Potential Application for High Temperature Membranes," Journal of the Ceramic Society of Japan, Jan. 2006, vol. 114, No. 1330, 5 pages.
Juttke, "Polymer derived ceramic membranes for gas separation," Chemical Engineering Transactions, Jan. 2013, vol. 32, 6 pages.
Pall Corporation, "Schumasiv—Ceramic Membrane Filter Elements," Data Sheet Pischumasivena, Jan. 2011, 2 pages.
Prasad et al., "Multilayer Amorphous-Si—B—C—N/ [gamma]—A1203/ [alpha]—A 1203 Membranes for Hydrogen Purification," Advanced Engineering Materials, Jun. 2010, vol. 12, No. 6, 7 pages.
Veolia Water Technologies, "CeraMem Ceramic Membranes Product Bulletin," published on or before Jan. 2016, 2 pages.
Wei et al., "Preparation of a Nano-Scale Ceramic Membrane and its Application in the Medium-Pressure Boiler with Phosphate Treatment," Desalination, Aug. 2013, 322, 9 pages.
PCT Invitation to Pay Additional Fees and, Where Applicable, Protest Fee issued in International Application No. PCT/US2018/062758 dated Mar. 18, 2019, 11 pages.
PCT International Search Report and Written Opinion issued in International Application No. PCT/US2018/062758 dated May 10, 2019, 17 pages.
GCC Examination Report in GCC Appln. No. GC 2018-36612, dated May 16, 2020, 5 pages.
GCC Examination Report in GCC Appln. No. GC 2018-36612, dated Oct. 15, 2020, 5 pages.

* cited by examiner

CERAMIC MEMBRANES

CROSS-REFERENCE TO RELATED PATENT APPLICATIONS

This application is a divisional of U.S. patent application Ser. No. 15/837,563, filed Dec. 11, 2017, the contents of which are incorporated by reference herein.

TECHNICAL FIELD

This document relates to ceramic membranes for the treatment of water.

BACKGROUND

A boiler evaporates liquid water to yield steam. Continuous production of steam requires an ongoing introduction of boiler feed water to the boiler. Over time, as steam is produced, the concentration of dissolved impurities in the boiler increases, diminishing steam production due at least in part to scale deposits on heat exchange surfaces. Boiler blowdown involves removing water from a boiler, for example by steam pressure within the boiler, to expel some of the dissolved impurities and thereby avoid precipitation of solids in the boiler. The water blown out of the boiler (boiler blowdown water) is typically expelled with force by steam pressure within the boiler and processed as wastewater.

SUMMARY

In a first general aspect, a filter includes a porous support defining one or more channels therethrough, and a porous ceramic membrane layer on a surface of the porous support defining at least one of the one or more channels. The ceramic membrane layer includes an inorganic ceramic composition having the formula $SiM^P_{xp}C_yN_zO_mH_n$, where:
  each $M^P$ present is independently selected from a p-block element or a d-block element;
  p is an integer from 1 to 5;
  for each $M^P$ present, xp is independently from about 0 to about 60;
  y is from about 0 to about 60;
  z is from about 0 to about 60;
  m is from about 0 to about 40; and
  n is zero or nonzero,
  where at least one of y and z is nonzero when p is zero, and p is nonzero when y and z are both zero.

In a second general aspect, making a filter includes contacting a porous support defining one or more channels therethrough with a preceramic polymer in a liquid state to coat a surface of at least one of the channels with the preceramic polymer, and pyrolyzing the preceramic polymer to yield a porous ceramic membrane layer on a surface of the porous support defining the at least one of the one or more channels. The ceramic membrane layer comprises the ceramic composition of the first general aspect.

Implementations of the first and second general aspects may include one or more of the following features.

The porous support may define a multiplicity of channels therethrough, and the filter includes a ceramic membrane layer on each surface of the porous support defining one of the one or more channels, where at least one of the ceramic membrane layers comprises the ceramic composition having the formula $SiM^P_{xp}C_yN_zO_mH_n$. In some cases, each of the ceramic membrane layers includes the ceramic composition having the formula $SiM^P_{xp}C_yN_zO_mH_n$. Each $M^P$ is independently boron, aluminum, zirconium, hafnium, and titanium. In some embodiments, p is 1, and $M^P$ is aluminum or boron. In some embodiments, the ceramic composition includes 1 wt % to 75 wt % silicon. In certain embodiments, the ceramic composition comprises 0 wt % to 60 wt % total $M^P$. The ceramic composition may include 0 wt % to 40 wt % carbon, 0 wt % to 50 wt % nitrogen, 0 wt % to 5 wt % oxygen, or any combination thereof. In some embodiments, the total amount of carbon and nitrogen in the ceramic composition is at least 30 wt %.

The porous support may include aluminum oxide. The porous support is typically tubular. The ceramic membrane pores may have a mean diameter of about 2 nm to about 50 nm.

Implementations of the second general aspect may include one or more of the following features.

The preceramic polymer may include polycarbosilane, polysilazane, or a combination thereof. Some implementations include combining an organic solvent with the preceramic polymer before contacting the porous support with the preceramic polymer. Pyrolyzing the preceramic polymer may include heating the preceramic polymer in the liquid state to a first temperature to solidify the preceramic polymer in the liquid state, thereby yielding a solid preceramic polymer coating on the support, and heating the solid preceramic polymer coating to a second temperature to yield the porous ceramic membrane on the support, wherein the second temperature is greater than the first temperature. Pyrolyzing the preceramic polymer may include heating the preceramic polymer to at least 600° C.

In a third general aspect, a boiler system includes a boiler and a filter element fluidly coupled the boiler. The filter element is configured to receive boiler blowdown water from the boiler and return a permeate from the filter element to the boiler.

In a fourth general aspect, treating boiler blowdown water from a boiler includes providing feed water to the boiler, removing blowdown water from the boiler, providing the blowdown water to a filter element, and providing a permeate from the filter element to the boiler, wherein a content of dissolved solids in the permeate is less than a content of dissolved solids in the blowdown water.

Implementations of the fourth general aspect may include one or more of the following features.

The filter element may include one or more filters defining one or more channels therethrough, and providing the blowdown water to the filter element may include providing the blowdown water to a first end of the one or more channels. Some implementations include removing a retentate from a second end of the one or more channels. Providing the permeate to the boiler may include removing the permeate from the filter element perpendicularly to a flow of the blowdown water through the one or more channels.

Use of the disclosed filter in connection with boilers will conserve millions of gallons of groundwater per year and significant energy savings. Such filters will reduce the load on existing desalination plants, and allow hot water boiler blow down to be recycled.

DETAILED DESCRIPTION

Figure 1:
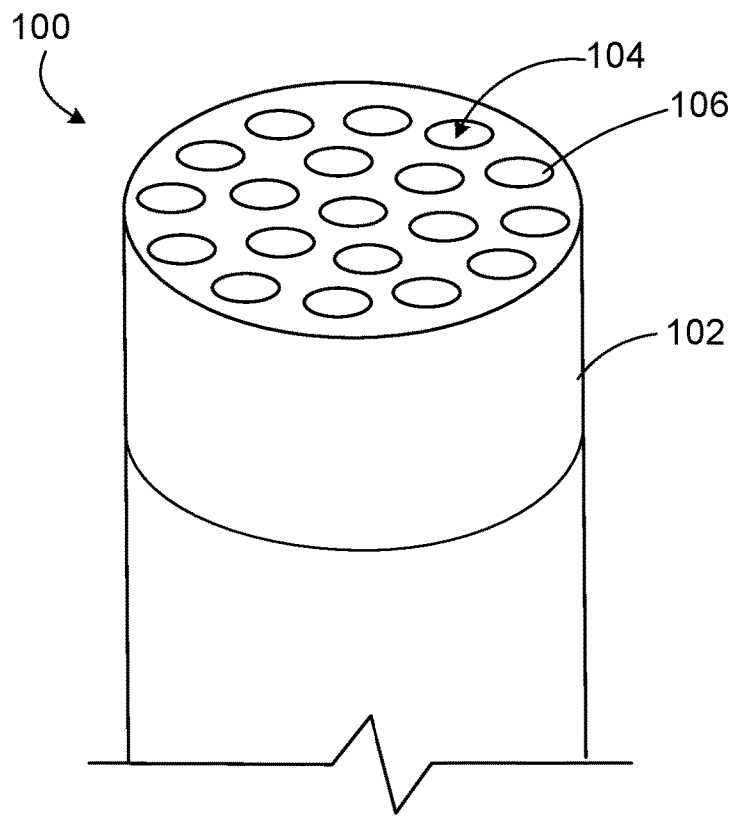
FIG. 1 depicts a filter having a ceramic membrane on a support.

Referring to FIG. 1, filter 100 includes support 102. Support 102 may include metal oxides such as α-alumina, δ-alumina, γ-alumina, or a combination thereof, cordierite, mullite, aluminum titanate, titania, zeolite, ceria, magnesia, silicon carbide, zirconia, zircon, zirconates, zirconia-spinel, spinel, silicates, borides, alumino-silicates, porcelain, lithium alumino-silicates, feldspar, magnesium alumino-silicates, and fused silica. In some embodiments, support 102 is formed of $Al_2O_3$. In certain embodiments, support 102 is formed of $\alpha-Al_2O_3$.

Support 102 may have a length from about 200 mm to about 2000 mm, and a diameter from about 5 mm to about 75 mm. Support 102 is typically tubular, with one or more channels 104 along a length of the support. In some embodiments, support 102 includes from 1 to 100 channels, 5 to 65 channels, or 15 to 40 channels. In certain embodiments, support 102 includes 1, 7, 19, 31, 37, or 61 channels. A cross section of channel 104 perpendicular to the length of support 102 may have a geometrical shape, such as circular, triangular, square, rectangular, pentagonal, hexagonal, or octagonal. Each channel 104 may have a diameter or maximum dimension between 1 mm and 20 mm. For support 102 having more than one channel 104, a diameter or maximum dimension of a first channel 104 in support 102 may be the same as or different than that of a second channel 104 in support 102. In some embodiments, a diameter or maximum dimension of each channel 104 in support 102 having more than one channel is substantially the same. Examples of suitable supports 102 include SCHUMASIV membrane filter elements available from Pall Corporation (Germany).

Each channel 104 of support 102 is coated with ceramic membrane 106. Support 102 may be selected such that the support has similar thermal characteristics to the thermal characteristics of ceramic membrane 106. In some embodiments, a total surface area of ceramic membrane 106 is from 0.01 mm² to 1 mm² or from 0.02 m² to 0.8 m². A thickness of ceramic membrane 106 is typically from 10 nm to 800 μm. In some embodiments, ceramic membrane 106 includes a single layer 106'. In certain embodiments, the ceramic membrane 106 includes an outer layer 106' and an inner layer 106", where the composition of the outer layer 106' is the same as or different than the composition of the inner layer 106". In other embodiments, the ceramic membrane 106 includes more than two layers, with at least two of the layers having a different composition.

At least one layer of the ceramic membrane 106 is formed of an inorganic composition with the chemical formula $SiM^{p}_{xp}C_yN_zO_mH_n$, in which:

each $M^p$ present is independently selected from a p-block element or a d-block element;

p is an integer from 0 to 5;

for each $M^p$ present, xp is independently from about 0 to about 60;

y is from about 0 to about 60;

z is from about 0 to about 60;

m is from about 0 to about 40; and n is zero or nonzero, where at least one of y and z is nonzero when p is zero, and p is nonzero when y and z are both zero. In one example, p is at least 1.

Figures 2A, 2B:
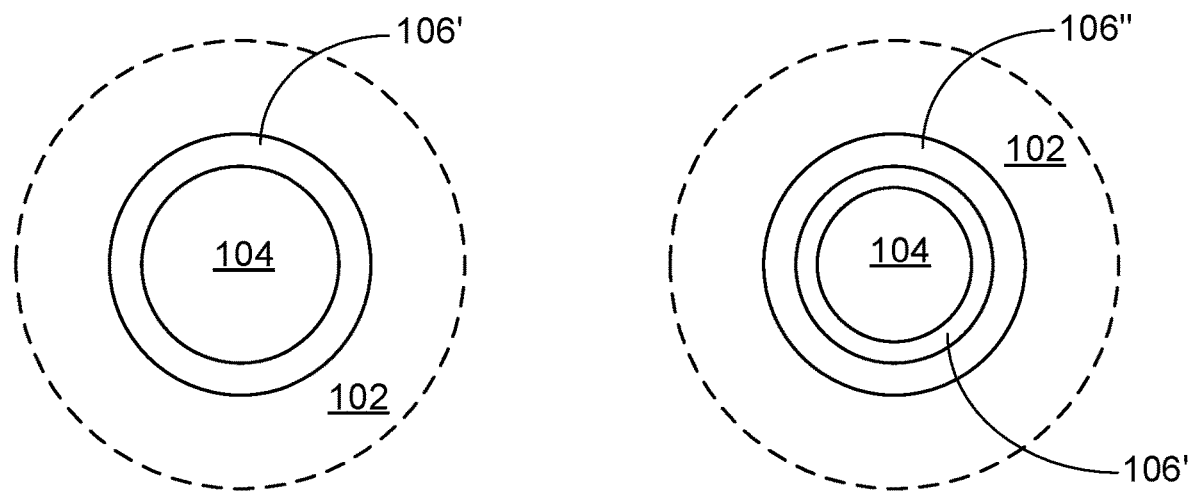
FIGS. 2A and 2B are cross-sectional views of portions of filters having a ceramic membrane.

FIG. 2A depicts an enlarged cross-sectional view of a ceramic membrane 106 on a surface of channel 104 in support 102. Ceramic membrane 106 has a single layer 106' formed of a composition with the chemical formula $SiM^{p}_{xp}C_yN_zO_mH_n$. FIG. 2B depicts an enlarged cross-sectional view of ceramic membrane 106 on a surface of channel 104 in support 102. Ceramic membrane 106 has an outer layer 106' and an inner layer 106". Outer layer 106' is typically formed of a composition with the chemical formula $SiM^{p}_{xp}C_yN_zO_mH_n$. In some embodiments, inner layer 106' is also be formed of a composition with the chemical formula $SiM^{p}_{xp}C_yN_zO_mH_n$. In certain embodiments, the composition of inner layer 106' is substantially the same as that of outer layer 106". In some embodiments, inner layer 106' is formed of $Al_2O_3$ (such as $\alpha-Al_2O_3$), $ZrO_2$, or $TiO_2$.

For each $M^p$ present in $SiM^{p}_{xp}C_yN_zO_mH_n$, examples of suitable p-block elements include boron, aluminum, tin, gallium, and phosphorus, and examples of suitable d-block elements include titanium, zirconium, hafnium, lanthanum, molybdenum, tungsten, cobalt, copper, and zinc. In some embodiments, p is 0, and the composition has the chemical formula $SiC_yN_zO_mH_n$. In some embodiments, p is 1, and the composition has the chemical formula $SiM^1_{x1}C_yN_zO_mH_n$. In some embodiments, p is 1, $M^1$ is Al, and the composition has the chemical formula $SiAl_{x1}C_yN_zO_mH_n$. In some embodiments, p is 1, $M^1$ is Al, x1 is 1, and the composition has the chemical formula $SiAlC_yN_zO_mH_n$. In some embodiments, p is 2, and the composition has the chemical formula $SiM^1_{x1}M^2_{x2}C_yN_zO_mH_n$.

Oxygen and hydrogen may be present in $SiM^{p}_{xp}C_yN_zO_mH_n$. However, oxygen preferably absent. Any oxygen present in the composition is inadvertently introduced, for example, during the manufacturing process or surface passivation. The amount of oxygen present, if any, is minimized to avoid reduced durability or decreased performance of the ceramic membrane during use.

In some embodiments, the ceramic composition includes less than 1 wt % oxygen.

In some embodiments, the ceramic composition includes silicon in an amount of about 1 wt % to about 75 wt %.

In some embodiments, the ceramic composition includes $M^p$ in a total amount of about 0 wt % to about 60 wt %.

In some embodiments, the ceramic composition includes carbon in an amount of about 0 wt % to about 40 wt %.

In some embodiments, the ceramic composition includes nitrogen in an amount of about 0 wt % to about 50 wt %.

In some embodiments, the ceramic composition includes oxygen in an amount of about 0 wt % to about 30 wt %.

In some embodiments, the combined amount of carbon and nitrogen in the ceramic composition is at least 30 wt %.

Layer 106' of ceramic membrane 106, formed of a ceramic composition having the formula $SiM^p{}_{xp}C_yN_zO_mH_n$ typically has an average pore size between 0.001 μm and 3 μm. In some embodiments, layer 106', formed of a ceramic composition having the formula $SiM^p{}_{xp}C_yN_zO_mH_n$, has a pore size between 0.001 μm and 8 μm or between 0.005 μm and 0.2 μm. In some embodiments, layer 106" has an average pore size between 0.001 μm and 2 μm. In one example, layer 106", formed of $Al_2O_3$ (such as α-$Al_2O_3$), has an average pore size between 0.2 μm and 2 μm. In other embodiments, layer 106", formed of $ZrO_2$, or $TiO_2$, has a pore size between 0.005 μm and 0.1 μm. As used herein, "average pore size" generally refers to the average pore size determined by mercury intrusion porosimetry in the cylindrical pore model hypothesis.

A porosity of support 102 is typically from about 30% to about 40%, about 32% to about 34%, or about 33%. A porosity of filter 100 is typically from about 10% to about 40%, about 15% to about 30%, or about 20% to about 25%. As used herein, "porosity" generally refers to the fraction of open porosity determined by mercury intrusion porosimetry.

Figure 3:
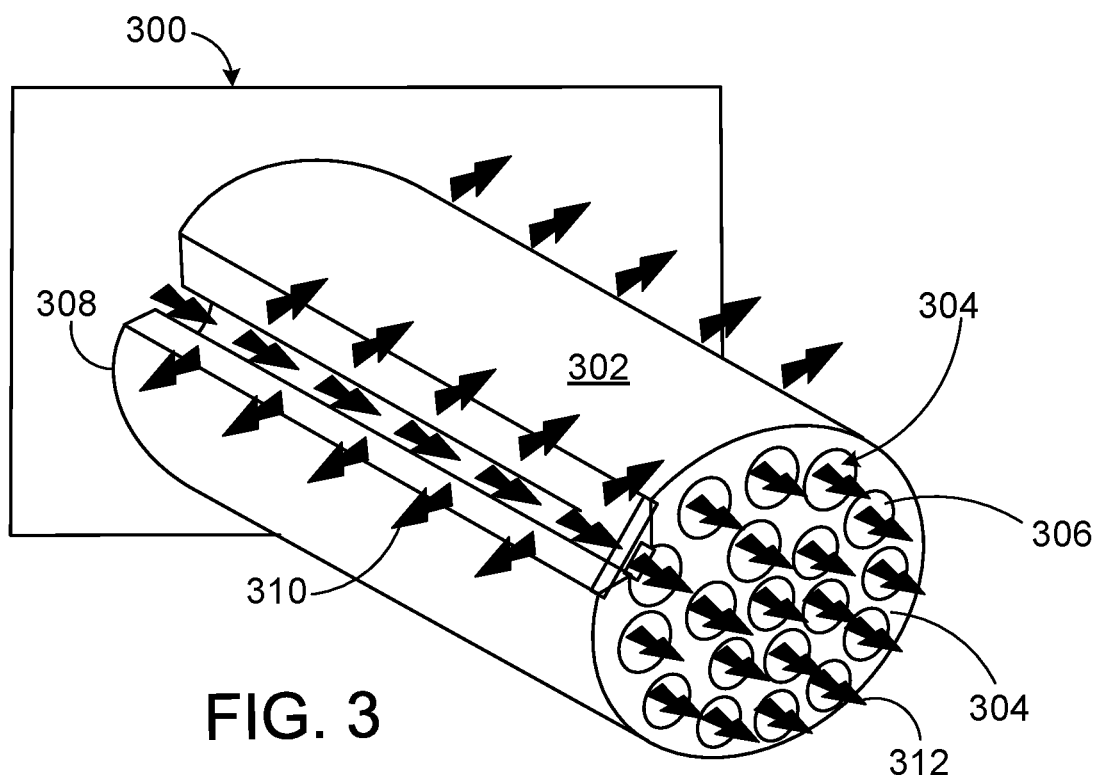
FIG. 3 depicts fluid flow through a filter having a ceramic membrane.

FIG. 3 depicts a cut-away perspective view of filter 300 including support 302 with channels 304 and ceramic membrane 306. In tangential (or cross) flow filtration, a pump is typically used to provide feed water to first end 308 of filter 300 and to circulate feed water across the surface of membranes ("tangential" to the membrane surface). The applied pressure acts as the driving force to transport solute and small molecules and ions through ceramic membrane 306. The cross flow of liquid over the surface of ceramic membrane 306 washes off particles trapped on the surface of the ceramic membrane, thereby keeping components of the feed water in the circulation stream. Feed water travels through channels 304, with permeate 310 exiting filter 300 transverse to the flow of the feed water. Permeate 310 is relatively low in dissolved solids. Retentate 312, relatively high in dissolved solids, exits filter 300 at second end 314 of filter 300.

Figure 4:
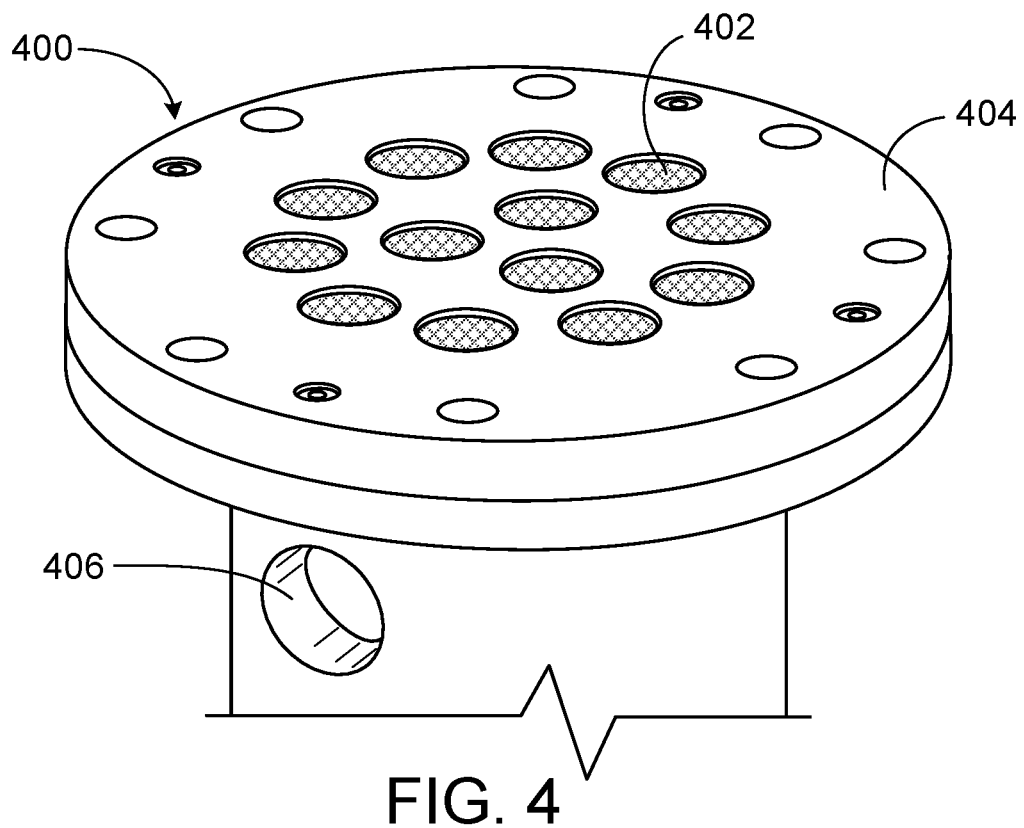
FIG. 4 depicts a filter housing.

FIG. 4 depicts filter element 400 including filters 402 in housing 404. In some embodiments, housing 404 holds one or more filters 402, where filters 402 are similar to filters 100 described with respect to FIG. 1. During use, feed water enters filter element 400 through a first end of filters 402, retentate exits the filter element through a second end of the filters, and permeate is removed from the filter element through outlet 406.

Figure 5:
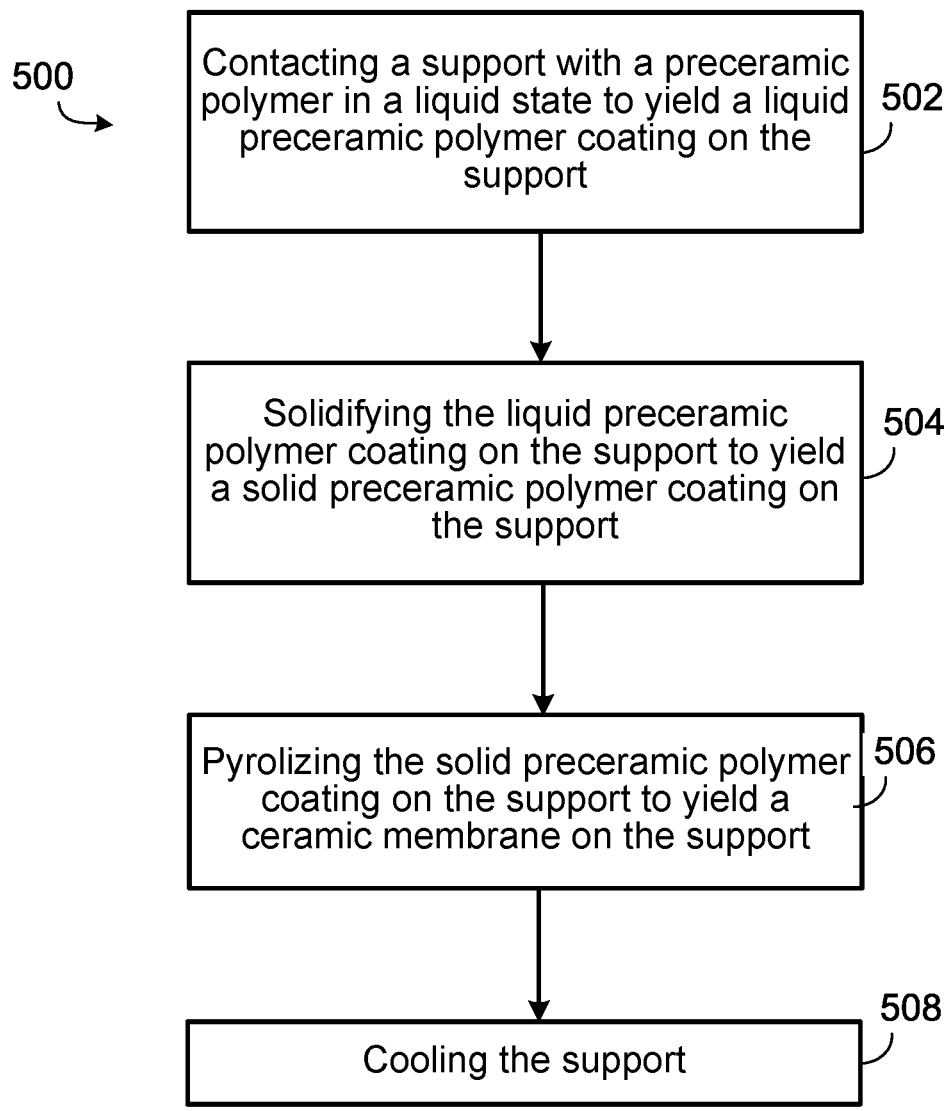
FIG. 5 is a flow chart for a process for forming a ceramic membrane on a support.

Referring to FIG. 5, a layer of a ceramic membrane having the formula $SiM^p{}_{xp}C_yN_zO_mH_n$ is formed on a support via process 500. In some embodiments, the support includes a first layer of a ceramic membrane on the channels of the support, such that forming a layer of a ceramic membrane having the formula $SiM^p{}_{xp}C_yN_zO_mH_n$ on the support includes forming the layer of the ceramic membrane as an outer layer over an inner layer of the ceramic membrane present on the support. The support, and the inner layer of the ceramic membrane, if present, is typically selected to be compatible with the ceramic membrane to be formed, thereby minimizing or preventing delamination of the ceramic membrane from the support after formation. Selecting a support to be compatible with the ceramic membrane to be formed may include selecting a support having thermal behavior that is similar to that of the ceramic membrane to be formed.

In 502, a support is contacted with a preceramic polymer in a liquid state to yield a liquid preceramic polymer coating on the support. As used herein, "preceramic polymer" generally refers to polycarbosilane, polysilazane, and their derivatives. In some embodiments, a suitable solvent may be combined with a preceramic polymer to reduce the viscosity of the preceramic polymer. Suitable polysilazanes include CERASET Polysilazane 20 and HTT 1800, both available from KiON Defense Technologies. CERASET Polysilazane 20, shown below,

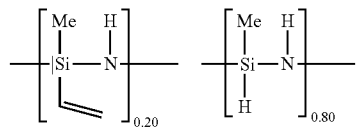

is a liquid polymer that can be converted to a solid preceramic upon heating to 90° C.-190° C. and then pyrolyzed to silicon carbide or silicon nitride containing ceramics by heating above 600° C. HTT 1800 is a low viscosity liquid polysilazane-based coating resin that solidifies upon heating to 200° C.-250° C. and can be converted to ceramic by heating to at least 400° C. Suitable polysilazanes also include Durazane products, available from EMD Performance Materials.

Contacting the support with a preceramic polymer in a liquid state typically includes coating the channel(s) of the support with the preceramic polymer. The preceramic polymer is typically in the form of a homogeneous composition. Coating the channel(s) of the support may be achieved by casting the preceramic polymer in the liquid state onto the surface of each channel in the support, such that a layer of liquid polymer is adsorbed onto surfaces of the support. The channel(s) may be coated with a substantially uniform, continuous layer of the preceramic polymer.

In 504, the liquid preceramic polymer coating on the support is solidified to yield a solid preceramic polymer coating on the support. Solidifying the liquid preceramic polymer coating on the support may be achieved via heating the support coated with the liquid preceramic polymer. In some embodiments, solidifying the liquid ceramic polymer coating on the support is achieved by heating the support to a temperature between 120° C. and 250° C. for a length of time between 60 min and 300 min.

In 506, the solid preceramic polymer coating is pyrolyzed on the support to yield a ceramic membrane (or a layer of a ceramic membrane) on the support. Pyrolyzing the solid preceramic polymer coating on the support may be achieved via heating the support coated with the solid preceramic polymer or irradiating the support coated with the solid preceramic polymer with electromagnetic radiation, such as ultraviolet radiation. In some embodiments, solidifying the liquid ceramic polymer coating on the support is achieved by heating the support to a temperature between 600° C. and 1600° C. or between 650° C. and 1200° C. for a length of time between 1 hour and 6 hours.

Heating the support in 504 or 506 may be achieved by heating the support in an atmosphere (for example, in an oven) that is substantially free of oxygen. As used herein, "substantially free of oxygen" generally refers to less than 0.1 vol % oxygen, less than 0.01 vol % oxygen, or less than 0.001 vol % oxygen. In some embodiments, the atmosphere includes nitrogen-containing gases, from which nitrogen is incorporated into the resulting membrane composition. Suitable gases that are substantially free of oxygen include inert gases, such as helium, neon, and argon, and nitrogen-containing gases, such as nitrogen and ammonia. In some embodiments, the atmosphere includes a mixture of nitrogen and ammonia in a range of 50/50 to 90/10 volume ratio of nitrogen to ammonia. Ammonia provides a reducing environment, resulting in a lower oxygen content of the ceramic membrane.

Heating the support in 504 or 506 in an oven may include increasing a temperature of the atmosphere in the oven until a desired temperature is reached. In some embodiments, the temperature may be increased from an initial temperature a rate of about 1° C. per minute until a solidification temperature is reached. The oven may be maintained at the solidification temperature for a length of time. In one example, the temperature is increased from room temperature at a rate of about 1° C. per minute until a temperature of 180° C. is reached, and the oven is maintained at 180° C. for 2 hours. In some embodiments, the temperature may be increased from the solidification temperature to a pyrolysis temperature is reached. The oven may be maintained at the pyrolysis temperature for a length of time. In one example, the temperature is increased from the solidification temperature at a rate of about 2° C. per minute until a temperature of at least 650° C. is reached, and the oven is maintained at a temperature of at least 650° C. for at least 2 hours.

In 508, the support is cooled. Cooling the support may include cooling the support in an inert atmosphere that is substantially free of oxygen, such as the atmosphere in which the pyrolysis occurs. The support is typically cooled at a rate between 1° C. per minute to 50° C. per minute. In one example, the support is cooled at a rate between 1° C. and 2.5° C. per minute.

In some embodiments, one or more operations in process 500 may be combined. In one example, a liquid preceramic polymer coating on the support may be heated in one operation, rather than heating the support to a first temperature for a first duration in 504 and a second temperature for a second duration in 506. In some embodiments, one or more operations in process 500 may be omitted, or additional operations may be added. In some embodiments, the order of one or more operations in process 500 may be altered.

The chemical composition and membrane properties of the resulting ceramic membrane (or layer) having formula $SiM^p{}_{xp}C_yN_zO_mH_n$, may be selected by selecting one or more parameters in process 500, including the chemical composition of the preceramic polymer, the chemical composition of the atmosphere in which the membrane is formed, the solidification temperature and associated heating rate, the pyrolysis temperature and the associated heating rate, or any combination thereof. In some embodiments, a ratio of carbon to nitrogen in the ceramic membrane is selected by selecting appropriate manufacturing parameters. A content of oxygen, hydrogen, or both in the ceramic membrane may be due at least in part to contamination during the manufacturing process or surface passivation after manufacturing. At low temperatures, the p-block and/or d-block elements M function as reticulation agents, linking "—Si—C—" or "—Si—N—" chains, and modifying the chemical properties of the ceramic membrane. At high temperatures, the p-block and/or d-block elements M alter the chemical and microstructural behavior of the ceramic membrane by limiting the crystallization of SiC and $Si_3N_4$, and by promoting formation carbide and nitride nanocrystals distributed in the amorphous silicon nitride/carbide phase.

A porosity of the ceramic membrane can be adjusted by altering one or more parameters in process 500. In one example, a porosity of the ceramic membrane can be decreased by performing operations 502 through 506 more than once during the manufacturing process. A target pore size may be achieved based at least in part on the preceramic polymer, the support, and the number of time operations 502 through 506 are repeated. In some embodiments, a porosity of a ceramic membrane formed via process 500 is between 21% and 25%.

Figure 6:
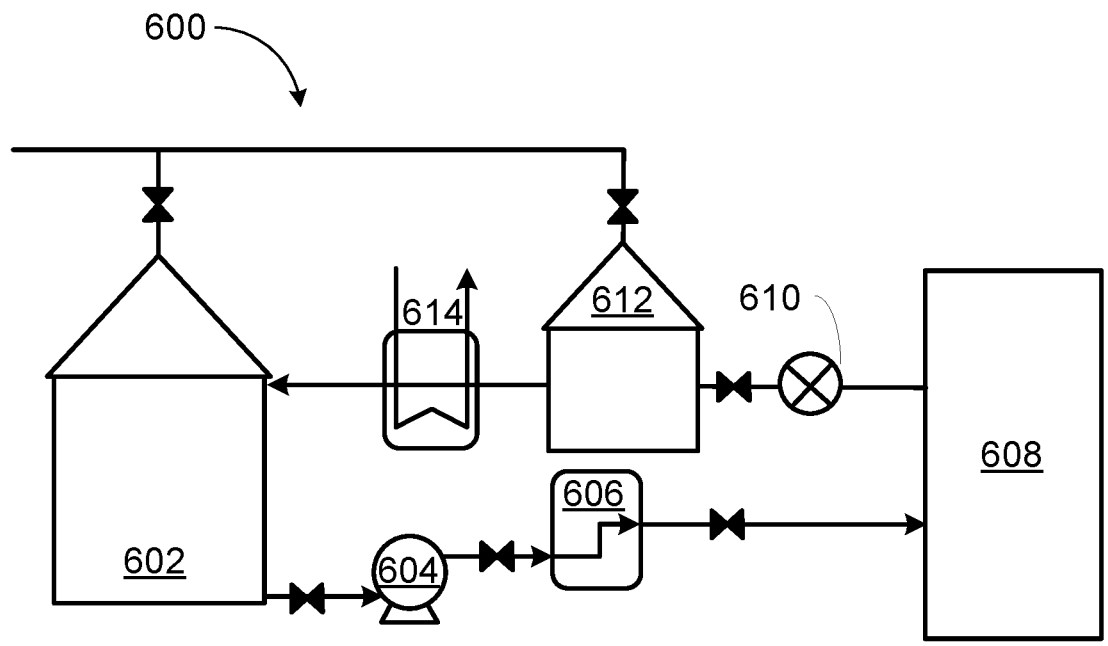
FIG. 6 depicts a system for forming a preceramic polymer coating on a support.

FIG. 6 depicts system 600 for forming a preceramic polymer coating on a support. Liquid preceramic polymer is pumped under nitrogen pressure from feed tank 602 via pump 604 through optional heater 606 and to an interior of support 608. Support 608 may be enclosed in a sealed container (not shown). The liquid preceramic polymer is allowed to circulate in support 608 until a permeate is formed, the liquid preceramic polymer passing from an interior of the support to an outer surface of the support. Retentate flows through flow meter 610 to product tank 612. The retentate passes through optional cooler 614 and returns to feed tank 602. Optional heater 606 and optional cooler 614 may be operated as needed to adjust a viscosity of the liquid preceramic polymer and the retentate, respectively. When the liquid preceramic polymer permeates the support, contacting surface of all pores in the support, and reaches the outer surface of the support, pressure is removed. The permeate may be discarded. The support is then drained (e.g., up to 2 hours) to remove excess liquid preceramic polymer, leaving a thin layer of the liquid preceramic polymer on surfaces of the support. After excess liquid preceramic polymer has been removed, the coated support is pyrolyzed (e.g., in a chamber furnace), converting the layer of liquid preceramic polymer into a nanostructured ceramic layer.

A filter having a ceramic membrane as described herein can be used to treat boiler blowdown water. The treated boiler blowdown water (the permeate) may be recycled back to the boiler without active cooling. That is, although the permeate may spontaneously lose heat to the environment before reintroduction to the boiler, the permeate does not undergo a process intentionally designed to reduce the temperature of the permeate before reintroduction to the boiler. Thus, the boiler blowdown water is conserved, and less energy is required to heat boiler blowdown water returned to the boiler than is required to heat boiler feed water at a lower temperature.

Figure 7:
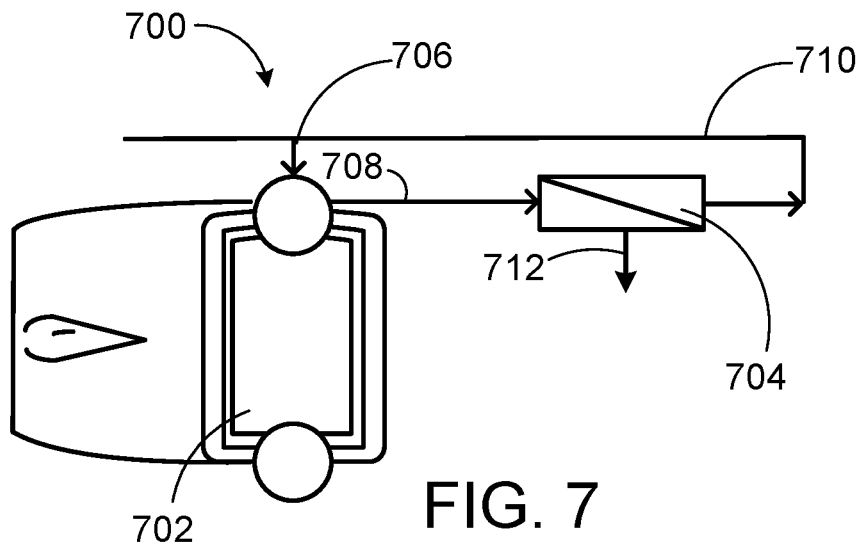
FIG. 7 depicts a boiler system including a filter having a ceramic membrane.

Referring to FIG. 7, boiler system 700 includes boiler 702 and filter element 704. Filter element 704 typically includes a filter housing such as that described with respect to FIG. 4 housing one or more filters as described with respect to FIGS. 1-3. Boiler feed water enters boiler 702 via conduit 706. Boiler blowdown water exits boiler 702 via conduit 708, and enters filter element 704. The permeate from filter element 704, relatively low in dissolved solids, is returned to boiler 702 via conduit 710 for conversion to steam. The permeate is not subjected to a cooling process before it is returned to boiler 702. The retentate from filter element 704, relatively high in dissolved solids, leaves boiler system 700 via conduit 712. That is, the retentate is not typically returned to boiler 702.

EXAMPLES

Example 1

A support purchased from PALL Corporation (SCHUMASIV, MF1200Z) made of ultrapure alumina and composed of 19 channels was casted for one minute by a liquid polysilazane polymer (CERASET PSZ 20). The coated support was dried under air for 2 hours at room temperature then placed in a furnace. The heat treatment was conducted under pure nitrogen. A heating rate of 1° C./min was applied up to 180° C. then a dwell was maintained for two hours. The temperature was raised to 800° C. (at 2° C./min) and kept for 4 hours before cooling down to room temperature at 5° C./min.

The resulting ceramic membrane was characterized by scanning electron microscopy (SEM), energy-dispersive X-ray spectroscopy (EDX), and mercury (Hg) porosity. The SEM image revealed a relatively homogeneous surface of the ceramic membrane at a magnification of 150×. The EDX analysis was performed on a JEOL JCM-6000 using the Zendesk App Framework (ZAF) method standardless quantitative analysis. Table 1 lists the Zendesk App Framework (ZAF) method standardless quantitative analysis with a fitting coefficient of 0.0301. Based on this data, taking into account the $Al_2O_3$ composition of the support, the composition of the ceramic membrane was found to be $SiC_{4.48}N_{3.27}O_{9.41}$. Note, however, that the presence of hydrogen is not detected via EDX. Based on results of the Hg porosity analysis, the support was found to have a bimodal distribution of pore sizes, with maxima at 6000 nm and 700 nm, and the ceramic membrane was found to have a monomodal distribution with a maximum at 160 nm.

TABLE 1

ZAF Method Standardless Quantitative Analysis

| Element | keV | Mass % | Sigma | Atom % | K |
|---|---|---|---|---|---|
| C K | 0.277 | 11.96 | 0.16 | 16.86 | 2.3475 |
| N K | 0.392 | 10.16 | 0.27 | 12.28 | 10.8103 |
| O K | 0.525 | 51.42 | 0.36 | 54.41 | 47.7539 |
| Al K | 1.486 | 20.22 | 0.12 | 12.69 | 30.6015 |
| Si K | 1.739 | 6.25 | 0.08 | 3.76 | 8.4868 |
| Total | | 100.00 | | 100.00 | |

Example 2

A support purchased from PALL Corporation (Schumasiv, MF1200Z) made of ultrapure alumina and composed of 19 channels was casted for one minute by a liquid polysilazane polymer (CERASET PSZ 20). The coated support was dried under air during 2 hours at room temperature then placed in a furnace. The heat treatment was conducted under pure nitrogen. A heating rate of 1° C./min was applied up to 180° C. then a two-hour dwell was maintained. The temperature was raised to 800° C. (at 2° C./min) and kept for 4 hours before cooling down to room temperature at 5° C./min. The resulting membrane material was characterized by SEM and EDX.

The obtained membrane was casted for a second time for one minute by the liquid polysilazane polymer (CERASET PSZ 20). The same heat treatment program was applied to the membrane to yield a double coated ceramic membrane. The resulting ceramic membrane was characterized by SEM, EDX, Hg porosity, and Brunauer-Emmett-Teller (BET) analysis. The SEM image revealed a relatively homogeneous surface of the ceramic membrane at a magnification of 2700×. The EDX analysis was performed on a JEOL JCM-6000 using the Zendesk App Framework (ZAF) method standardless quantitative analysis. Table 2 lists the Zendesk App Framework (ZAF) method standardless quantitative analysis with a fitting coefficient of 0.0408. Based on this data, taking into account the $Al_2O_3$ composition of the support, the composition of the ceramic membrane was found to be $SiC_{9.34}Ni_{5.79}O_{11.48}$. Note, however, that the presence of hydrogen is not detected via EDX. Based on results of the Hg porosity analysis, the support was found to have a bimodal distribution of pore sizes, with maxima at 6000 nm and 700 nm, and the ceramic membrane was found to have a monomodal distribution with a maximum at 90 nm.

TABLE 2

ZAF Method Standardless Quantitative Analysis

| Element | keV | Mass % | Sigma | Atom % | K |
|---|---|---|---|---|---|
| C | 0.277 | 19.53 | 0.08 | 23.92 | 11.0065 |
| N | 0.392 | 38.49 | 0.28 | 40.43 | 55.1109 |
| O | 0.525 | 34.37 | 0.28 | 31.61 | 17.2970 |
| Al | 1.486 | 2.72 | 0.03 | 1.48 | 5.1760 |
| Si | 1.739 | 4.89 | 0.04 | 2.56 | 11.4096 |
| Total | | 100.00 | | 100.00 | |

Figure 8:
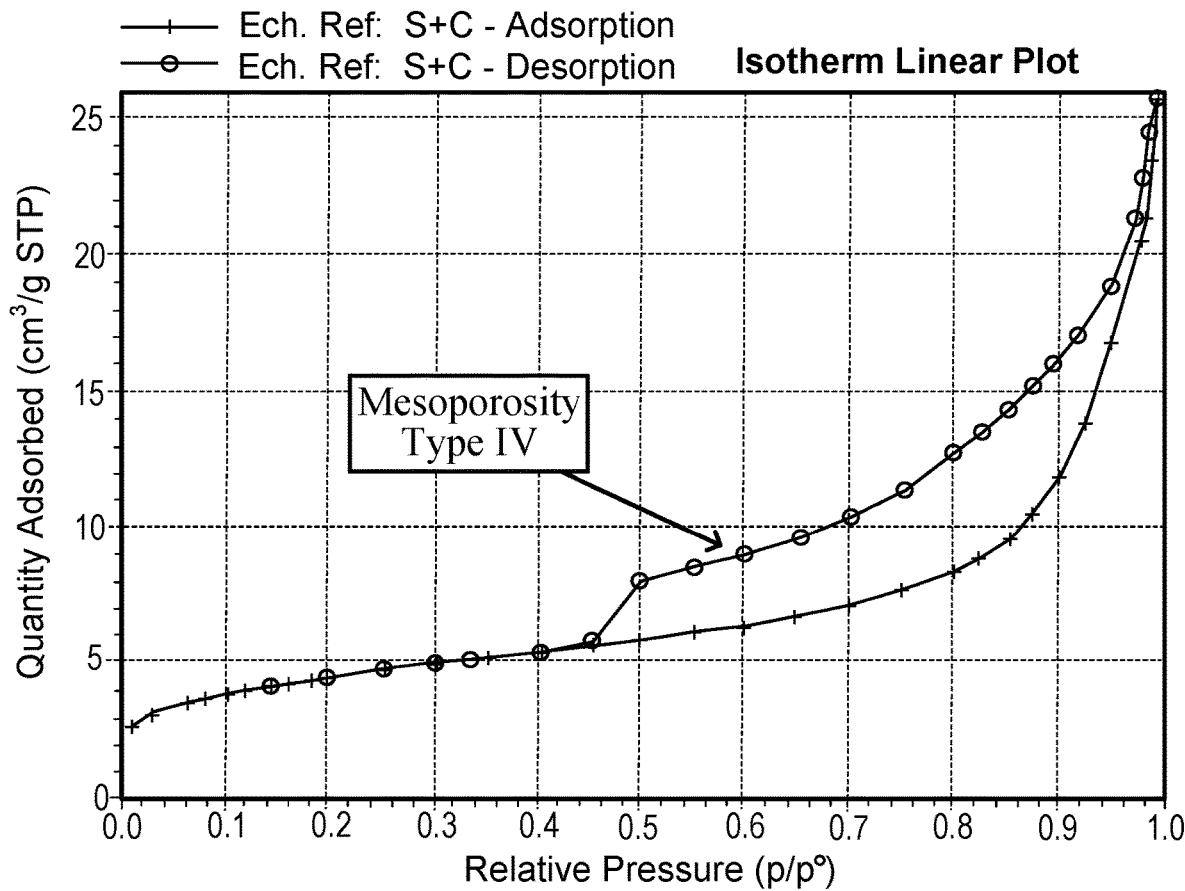
FIG. 8 shows a Brunauer-Emmett-Teller (BET) analysis of the membrane of Example 2, with type IV mesoporosity inside the membrane.
Figure 9:
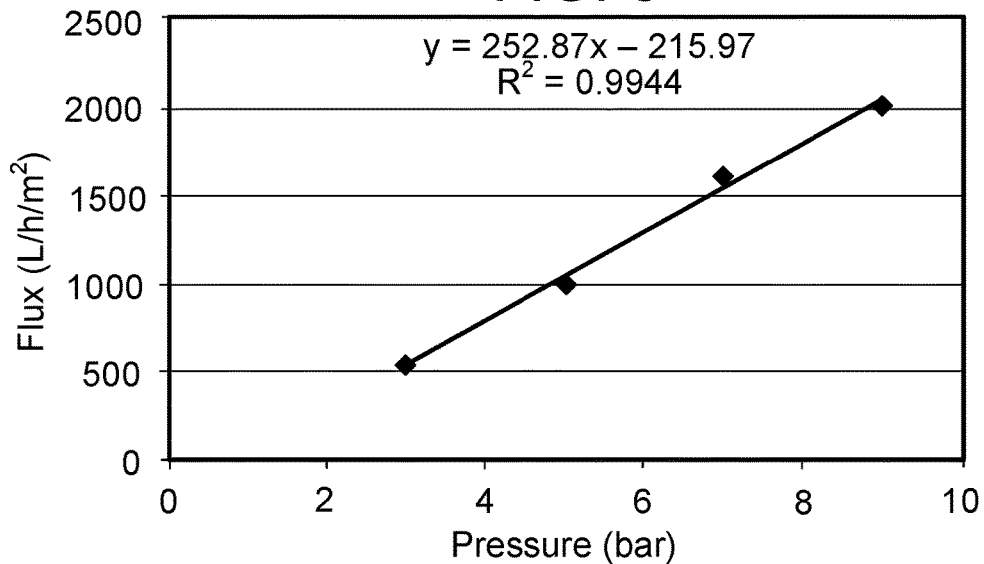
FIG. 9 shows membrane permeation rate versus pressure for the membrane of Example 2.

FIG. 8 shows Brunauer-Emmett-Teller (BET) analysis of the membrane of Example 2, showing type IV mesoporosity inside the membrane. FIG. 9 illustrates linear dependence of the permeate flux on the applied pressure for the membrane of Example 2.

Table 3 lists permeate water quality, Table 4 lists feed water quality, and Table 5 lists permeate conductivity with time for water treated with the filter of Example 2.

TABLE 3

Permeate Water Quality

| Ions | Concentration (ppm) |
|---|---|
| Calcium ($Ca^{2+}$) | 1 |
| Magnesium ($Mg^{2+}$) | <DL |
| Chloride ($Cl^-$) | 1 |
| Sodium ($Na^+$) | 30 |
| Potassium ($K^+$) | <DL |
| Sulfate ($SO_4^{2-}$) | 0.7 |
| Phosphate | <DL |

TABLE 4

Feed Water Quality

| Ions | Concentration (ppm) |
|---|---|
| Calcium ($Ca^{2+}$) | 1.9 |
| Magnesium ($Mg^{2+}$) | 1 |
| Chloride ($Cl^-$) | 28 |
| Sodium ($Na^+$) | 122 |
| Potassium ($K^+$) | 2 |
| Sulfate ($SO_4^{2-}$) | 7 |
| Phosphate | 35.5 |

TABLE 5

Permeate Conductivity with Time

| Day | Conductivity (µS/cm) | pH |
|---|---|---|
| 1 | 250 | 10.0 |
| 2 | 250 | 10.5 |
| 3 | 260 | 10.5 |
| 5 | 255 | 9.5 |
| 8 | 248 | 9.5 |
| 9 | 251 | 9.5 |
| 10 | 216 | 9.5 |
| 11 | 219 | 9.4 |
| 12 | 171 | 9.6 |

Tables 6 and 7 provide water flux of membranes formed as described in Examples 1 and 2, respectively. Table 6 lists water flux of a 19-channel membrane at pressures from 3 bar to 9 bar, with flux ranging from 439 L/h/m² to 1423 L/H/m², respectively. Table 7 lists water flux of a double-coated 19-channel membrane at pressures from 3 bar to 9 bar, with flux ranging from 119 L/h/m² to 389 L/H/m², respectively.

TABLE 6

Water flux of 19-channel membranes at various pressures

| Pressure (bar) | Volume (L) | Time (s) | Time average (s) | Flow (L/h) | Area (m²) | Flux (L/h/m²) |
|---|---|---|---|---|---|---|
| 3 | 0.2 | 47 | 47 | 15.3 | 0.0349 | 438.9 |
|   |     | 47 |    |      |        |       |
|   |     | 47 |    |      |        |       |
| 5 | 0.2 | 24 | 24 | 29.3 | 0.0349 | 842 |
|   |     | 22.3 |    |    |        |     |
|   |     | 26 |    |      |        |       |
| 7 | 0.2 | 18.5 | 18.5 | 38.9 | 0.0349 | 1115.1 |
|   |     | 18 |    |      |        |       |
|   |     | 18.5 |    |     |        |       |
| 9 | 0.2 | 14.5 | 14.5 | 49.6 | 0.0349 | 1422.7 |
|   |     | 14.5 |    |     |        |       |
|   |     | 14.5 |    |     |        |       |

TABLE 7

Water flux of 19-channel double coated membranes at different pressures

| Pressure (bar) | Volume (L) | Time (s) | Time average (s) | Flow (L/h) | Area (m²) | Flux (L/h/m²) |
|---|---|---|---|---|---|---|
| 3 | 0.1 | 86.7 | 86.6 | 4.2 | 0.0349 | 119 |
|   |     | 86.6 |    |     |        |     |
|   |     | 86.7 |    |     |        |     |
| 5 | 0.1 | 47.7 | 47.5 | 7.6 | 0.0349 | 217.2 |
|   |     | 47.5 |    |     |        |     |
|   |     | 47.3 |    |     |        |     |
| 7 | 0.1 | 36.8 | 36.6 | 9.8 | 0.0349 | 281.8 |
|   |     | 36.5 |    |     |        |     |
|   |     | 36.4 |    |     |        |     |
| 9 | 0.1 | 26.5 | 26.5 | 13.6 | 0.0349 | 389.2 |
|   |     | 26.6 |    |     |        |     |
|   |     | 26.4 |    |     |        |     |

Other Information

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 990.99%, or at least about 99.999% or more.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of making a filter, the method comprising:
    pumping a liquid preceramic polymer through an interior of a porous support, the liquid preceramic polymer comprising a preceramic polymer in an organic solvent, the preceramic polymer comprising

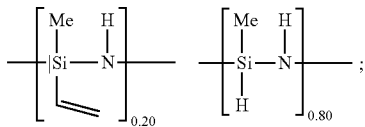

circulating the liquid preceramic polymer through the porous support until the liquid preceramic polymer permeates a channel in the porous support and passes from the interior of the porous support to an outer surface of the porous support, forming a permeated porous support; and
    pyrolyzing the permeated porous support to yield a porous ceramic membrane layer on a surface of the channel of the porous support.

2. The method of claim 1, wherein the porous ceramic membrane layer comprises a ceramic composition having a formula comprising $SiC_{4.48}N_{3.27}O_{9.41}$.

3. The method of claim 1, wherein the porous ceramic membrane layer comprises a ceramic composition having a formula comprising $SiC_{9.34}N_{15.79}O_{11.48}$.

4. The method of claim 1, wherein pyrolyzing the permeated porous support comprises:
    heating the permeated porous support in the liquid state to a first temperature to solidify the liquid preceramic polymer, forming a solid preceramic polymer in the channel of the support; and
    heating the solid preceramic polymer to a second temperature to yield the porous ceramic membrane layer on the surface of the channel of the porous support, wherein the second temperature is greater than the first temperature.

5. The method of claim 1, wherein pyrolyzing the permeated porous support comprises heating the permeated porous support to at least 600° C.

* * * * *